United States Patent [19]
Wagener

[11] Patent Number: 6,100,473
[45] Date of Patent: Aug. 8, 2000

[54] SUPPORT FOR BUSBARS OF A BUSBAR SYSTEM

[75] Inventor: Hans Wagener, Dietzhölztal, Germany

[73] Assignee: Rittal-Werk Rudolf Loh GmbH & Co. KG, Herborn, Germany

[21] Appl. No.: 09/036,899

[22] Filed: Mar. 9, 1998

[30] Foreign Application Priority Data

Mar. 25, 1997 [DE] Germany ............................ 197 12 363

[51] Int. Cl.⁷ ................................ H02G 5/00; H02G 3/00
[52] U.S. Cl. ................... 174/99 R; 174/71 B; 174/72 B; 174/99 B
[58] Field of Search ............................... 174/133 B, 71 B, 174/72 B, 88 B, 99 B, 129 B, 48, 68.2, 70 B, 97, 99 R, 133 R, 126.3

[56] References Cited

U.S. PATENT DOCUMENTS

| | | | |
|---|---|---|---|
| 1,846,714 | 2/1932 | Frank ........................................ | 361/611 |
| 2,318,859 | 5/1943 | Huguelet ................................. | 248/68.1 |
| 3,622,687 | 11/1971 | Doughty .................................. | 174/97 |
| 4,030,794 | 6/1977 | Rozenboom et al. .................. | 439/213 |
| 5,008,493 | 4/1991 | Wagener ................................. | 174/68.2 |
| 5,089,667 | 2/1992 | Goussin et al. ........................ | 174/101 |
| 5,875,821 | 3/1999 | Dumser et al. ......................... | 138/162 |

*Primary Examiner*—Kristine Kincaid
*Assistant Examiner*—Mark Olds
*Attorney, Agent, or Firm*—Pauley Petersen Kinne & Fejer

[57] ABSTRACT

A support for busbars of a busbar system, which can be fixed in place on a fastening surface and which forms a receptacle which is adapted to a width and a thickness of the busbar. A later attachment to the pre-positioned busbar system is made possible due to correspondingly divided supports, if the support has two L-shaped receiving elements, whose legs, aligned parallel with the fastening surface, determine the width of the receptacle, and which have on front ends facing each other dovetailed strips and dovetailed grooves aligned with each other, which extend in a longitudinal direction of the busbar to be inserted into the receptacle. The legs of the receiving elements are oriented perpendicularly with respect to the fastening surface and determine the height of the receptacle. The facing sides of the two receiving elements have projecting support strips, which can be inserted into longitudinal grooves of the busbar, to be placed into the receptacle.

19 Claims, 3 Drawing Sheets

SUPPORT FOR BUSBARS OF A BUSBAR SYSTEM

BACKGROUND OF THE INVENTION

1. Field of the Invention

This invention relates to a support for busbars of a busbar system, which can be fixed in place on a fastening surface and which forms a receptacle adapted to a width and a thickness of the busbar.

2. Description of Prior Art

Supports for busbars of a busbar system are known, wherein base elements, in which the receptacles for busbars are formed and which are open at a side facing away from the fastening surface and can be closed by cover elements, can be connected with the fastening surface. Here, the receptacles in the base element are cut at predetermined distances and matched to dimensions of a largest cross section of the busbars. Insertion elements can be placed into the receptacles, which reduce the cross section of the receptacles in order to fix busbars of lesser cross section.

Not only does this known design of the support require many different components in order to fix busbars of different cross section in place at different distances, but pre-positioned busbars of a busbar system cannot additionally be fixed in place at different places later.

SUMMARY OF THE INVENTION

It is one object of this invention to provide a support for busbars of a busbar system of a known type in such a way, that primarily the later additional fixation in place of busbars already fastened to a fastening surface becomes possible.

In accordance with this invention, this object is attained with a support having two L-shaped receiving elements, with legs, aligned parallel with the fastening surface, that determine the width of the receptacle, and which have on their front ends facing each other dovetailed strips and dovetailed grooves aligned with each other, which extend in a longitudinal direction of the busbar to be inserted into the receptacle. The legs of the receiving elements oriented perpendicularly with respect to the fastening surface determine the height of the receptacle. The facing sides of the two receiving elements have projecting support strips, which can be inserted into longitudinal grooves of the busbar which is placed into the receptacle.

The two receiving elements can approach the busbar from both sides and be connected in the longitudinal direction of the same by the dovetailed connections. In this case the busbar can already be attached to the fastening surface by supports and be at a distance from the fastening surface which provides space for the legs of the receiving elements having dovetailed strips and dovetailed grooves. The use of busbars with longitudinal grooves has the advantage that the busbars are maintained in the receptacle even without cover elements. In this case the support strips need not absolutely fill the entire cross section of the longitudinal groove in the busbar. It is sufficient if the support strips extend into the longitudinal groove and occupy at least the narrower insertion distance of a longitudinal groove formed in a T-shape.

In one preferred embodiment of this invention, the busbar is designed with an essentially square exterior cross section and has in the center longitudinal grooves of T-shaped cross section.

An increase in cross section of the busbar is achieved in a simple way because the legs of the receiving elements which are aligned parallel with the fastening surface are laid out for the width of several busbars, which are to be inserted, adjoining each other, into the receptacle. The legs of the receiving elements can be oriented perpendicularly with respect to the fastening surface and laid out for the height of several busbars, which can be inserted on top of each other into the receptacle.

In the latter case, the packaged busbars can be maintained in the receptacle because the sides of the legs of the receiving elements which define one receptacle and which face each other have one support strip per busbar.

It is easily within the scope of this invention to improve the fastening of the busbars in the receptacles with receptacles that can be closed by strip-shaped cover elements, which can be screwed together with the front faces of the legs of the receiving elements which extend perpendicularly with respect to the fastening surface.

In one embodiment, a simple fastening of the supports on a fastening surface results in the sides of the receiving elements facing the fastening surface having a dovetailed fastening strip, which can be inserted into a dovetailed fastening groove of a fastening rail. The receiving elements can then be pushed into the fastening rail and fixed in place. It is then only necessary to connect the fastening rail with the fastening surface.

In this case the orientation of the fastening elements on the receiving elements can be selected so that the dovetailed fastening strips of the receiving elements and the dovetailed fastening grooves of the fastening rail extend transversely to the longitudinal direction of the busbars, or that the dovetailed fastening strips of the receiving elements and the dovetailed fastening grooves of the fastening rail are aligned in the longitudinal direction of the busbars.

In the first case, all elements of the support can be fixed in beforehand on the fastening rail, so that the busbars can be inserted in their longitudinal directions into the receptacles made in this way. The last mentioned orientation is particularly suited for later attachment to fixedly placed busbars, since the receiving elements can be connected in their connecting device along the busbars also with the fastening rail.

BRIEF DESCRIPTION OF THE DRAWINGS

This invention will be described in more detail by means of the exemplary embodiments represented in the drawings, wherein.

DESCRIPTION OF PREFERRED EMBODIMENTS

Figure 1:
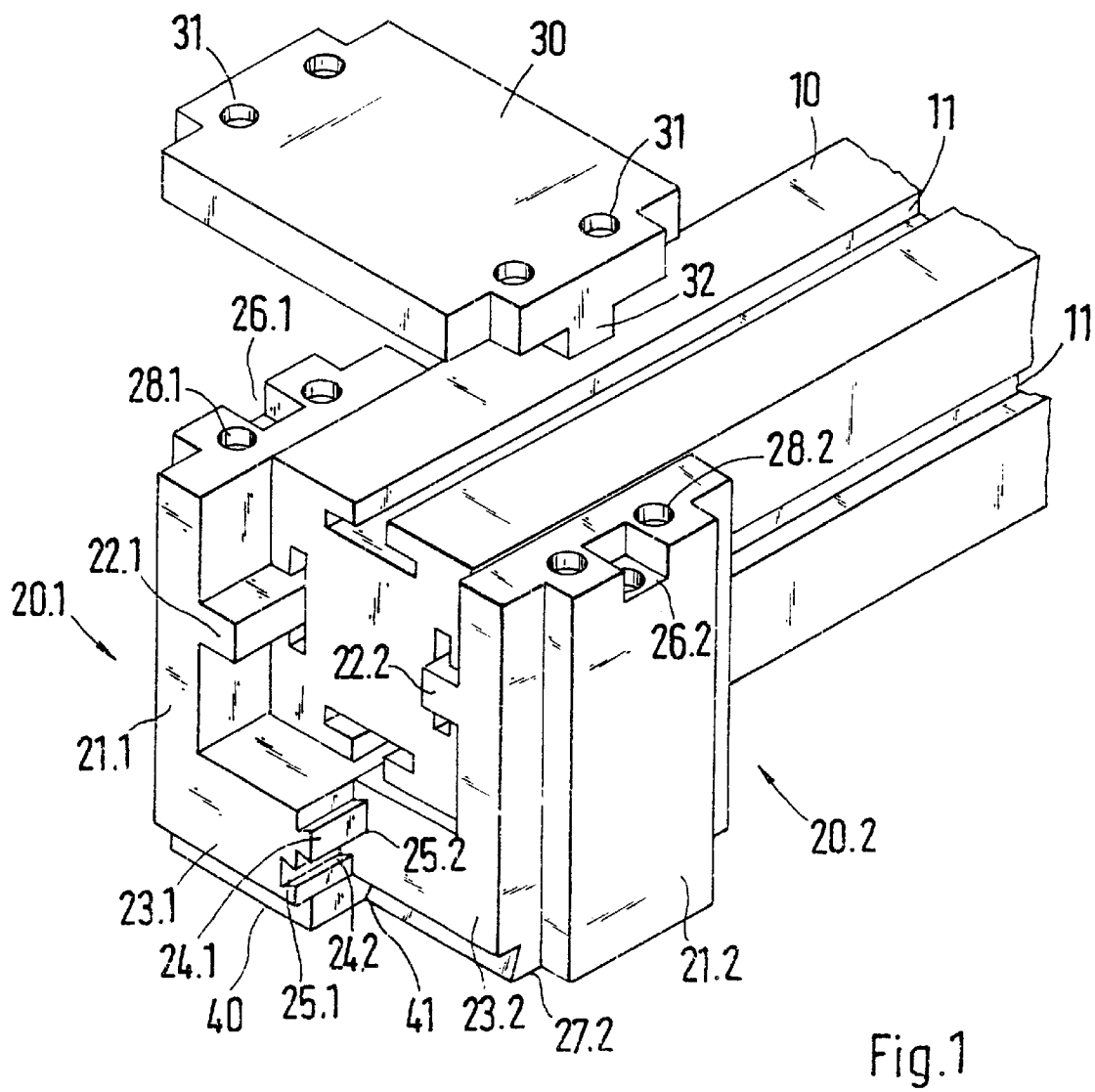
FIG. 1 is a perspective view of a support for a single busbar.

As shown in FIG. 1, busbar 10 with an essentially square exterior cross section is used in one embodiment, wherein a longitudinal T-groove is cut in the center of all exterior sides. The support comprises two L-shaped receiving elements 20.1 and 20.2, wherein second legs 23.1 and 23.2, which are aligned parallel with the fastening surface, are oriented toward each other and connected with each other at the front. The second legs 23.1 and 23.2 are matched in dimensions to half a width of the busbar 10, so that the busbar 10 can be fittingly inserted into the receptacle formed in this way. The connection of the two receiving elements 20.1 and 20.2 is accomplished via dovetailed grooves 25.1 and 25.2 and dovetailed strips 24.1 and 24.2. Here, each second leg 23.1 and 23.2 has respectively one dovetailed strip 24.1, or respectively 24.2, and one dovetailed groove 25.1, or respectively 25.2, which are matched to each other and arranged in such a way that two dovetailed connections are created when the two receiving elements 20.1 and 20.2 are plugged together in the longitudinal direction with respect to the busbar 10.

First legs 21.1 and 21.2 of the receiving elements 20.1 and 20.2, which extend perpendicularly with respect to the fastening surface, have support strips 22.1 and 22.2 on their facing sides, which engage the facing longitudinal grooves 11 of the busbar 10. In this case it is sufficient if the support strips 22.1 and 22.2 only occupy the insertion section of T-shaped longitudinal groove 11 of the busbar 10 which is narrower in cross section. This also has an advantage that the receiving elements 20.1 and 20.2 are brought, offset in the longitudinal direction, to both sides of the busbar 10 and inserted with the support strips 22.1 and 22.2 into the longitudinal grooves 11 before the receiving elements 20.1 and 20.2 are displaced in the longitudinal direction of the busbar 10 and connected with each other. This is of particular advantage when the support needs to be attached to a busbar 10 which is pre-positioned and fastened on a fastening surface.

The support strips 22.1 and 22.2 can also have T-shaped cross sections and be adapted to the cross section of the longitudinal grooves 11 of the busbars 10. This design is advantageous in cases where the busbar 10 can be inserted in the longitudinal direction through the receptacle formed by the receiving elements 20.1 and 20.2.

First legs 21.1 and 21.2 of the receiving elements 20.1 and 20.2, which extend perpendicularly with respect to the fastening surface, are adapted to the height and the width of the busbar 10. For improved support, the receptacle can have a strip-shaped cover element 30, which engages the recesses 26.1 and 26.2 in the front faces of first legs 21.1 and 21.2 by means of protrusions 32 and which is screwed together with the receiving elements 20.1 and 20.2, as indicated by the fastening receptacles 28.1, 28.2 and 31.

Figure 2:
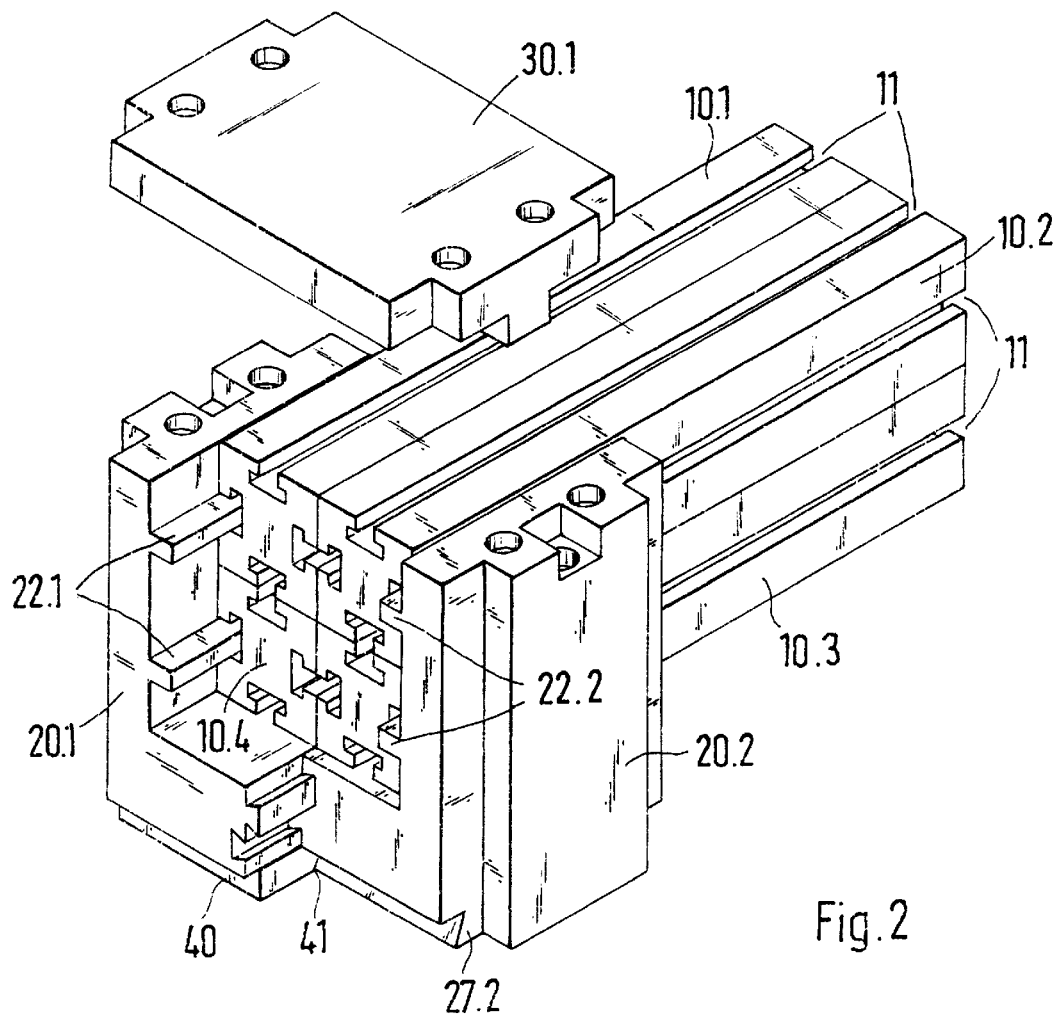
FIG. 2 is a perspective view of a support for a packaged busbar.

In connection with the embodiment of FIG. 2, a packaged busbar composed of four identically designed busbars 10.1, 10.2, 10.3 and 10.4 is fixed in place in a support. Here, the receptacle is designed for double the width and height, since two busbars 10.1 and 10.2, or respectively 10.3 and 10.4, are arranged next to each other, and two of the same busbars 10.1 and 10.4, or respectively 10.2 and 10.3, are arranged on top of each other. In comparison with the embodiment of FIG. 1, the legs of the receiving elements 20.1 and 20.2 are twice as long. All other components of the receiving elements 20.1 and 20.2 remain unchanged. The cover element is correspondingly widened.

As shown in connection with both exemplary embodiments, the receiving elements 20.1 and 20.2 of the supports can be fastened in a simple manner on a fastening rail 40. The sides of second legs 23.1 and 23.2 facing the fastening surface, i.e. the fastening rail 40, form a dovetailed fastening strip 27.1 and 27.2 extending transversely to the longitudinal direction of the busbars 10. 1, 10.2, 10.3 and 10.4 and can be inserted into a dovetailed fastening groove 41 of the fastening strip 40. This arrangement is preferred when it is possible to pre-attach the receiving elements 20.1 and 20.2 to the fastening rail 41 prior to the busbars 10, 10.1 to 10.4 being attached to the fastening rail 40, and to insert the busbars in the receptacles of the support only after this.

However, the orientation of the dovetailed fastening connections can also be provided in the longitudinal direction of the busbars, so that additional supports can also be easily applied to an already placed busbar system at a later time.

Figure 3:
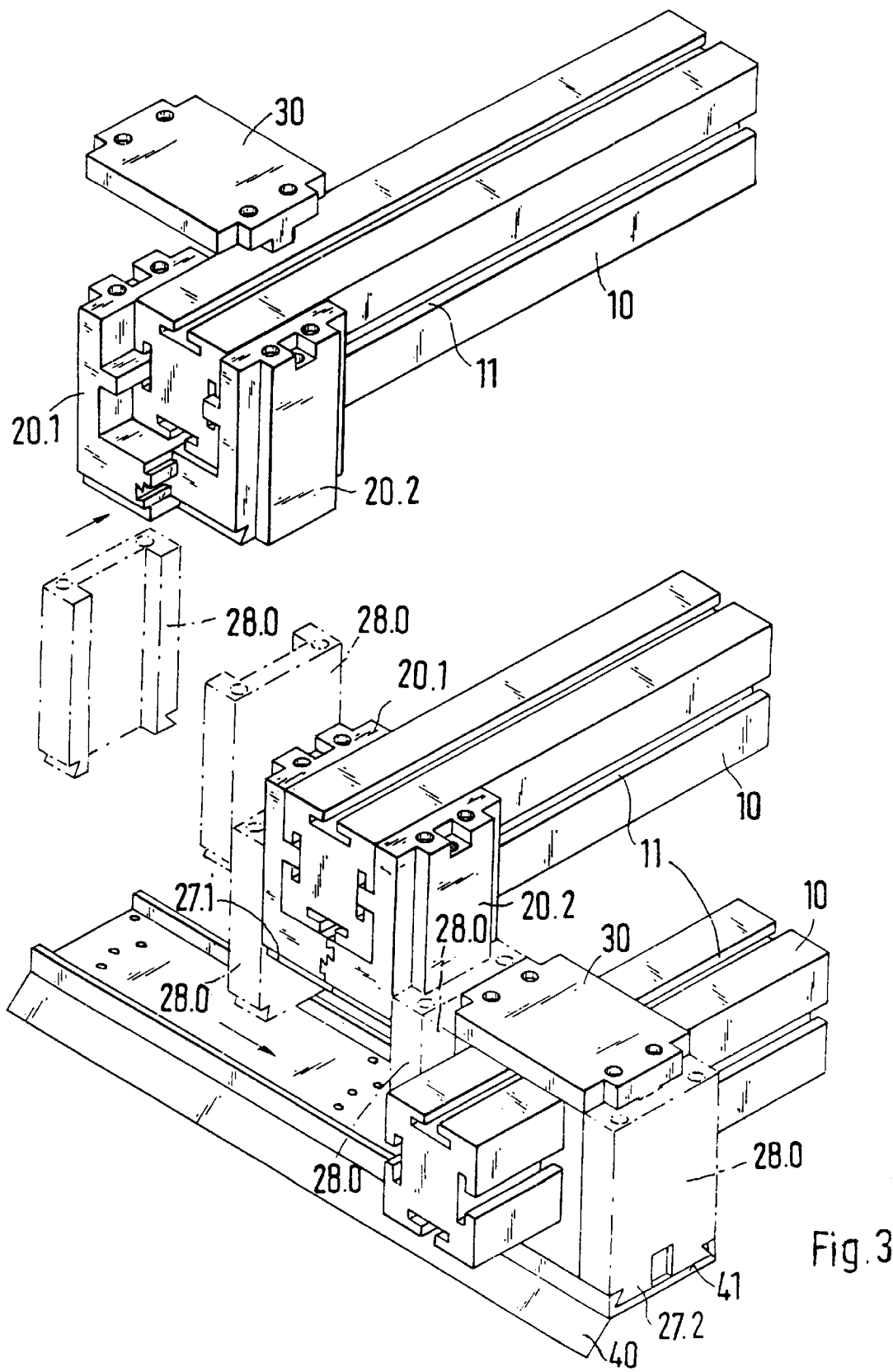
FIG. 3 is an exploded perspective view of an arrangement of supports for a three-phase busbar system.

As shown by means of the exemplary embodiment in FIG. 3, the receiving elements 20.1 and 20.2 in accordance with FIG. 1 can also be used for constructing a three-phase busbars system. The fastening rail 40 receives a corresponding number of receiving elements 20.1 and 20.2, which in pairs form the receptacles for the three busbars 10. In order to obtain the correct distance from the busbars 10, additional spacer elements 28.0 can be used, which can also be fixed in place by means of a dovetailed strip in the dovetailed fastening groove 41 of the fastening rail 40.

It is also possible to provide additional connecting elements adapted to the width of the busbar 10. In this way the receiving elements 20.1 and 20.2 in accordance with FIG. 1 can be adapted to the dimensions for receiving packaged busbars in accordance with FIG. 2. In this case the connecting elements have dovetailed strips and dovetailed grooves on their front ends, which correspond to the front ends of second legs 23.1 and 23.2 and are appropriately distributed and arranged.

What is claimed is:

1. In a support for busbars of a busbar system, which can be fixed in place on a fastening surface and which forms a receptacle which is adapted to a width and a thickness of a busbar, the improvement comprising:

the support having two L-shaped receiving elements (20.1, 20.2) with second legs (23.1, 23.2) aligned parallel with respect to the fastening surface which determine a width of the receptacle, the L-shaped receiving elements (20.1, 20.2) having front ends facing each other with dovetailed strips (24.1, 24.2) and dovetailed grooves (25.1, 25.2) aligned with each other which extend in a longitudinal direction of the busbar (10);

a plurality of supporting strips (22.1, 22.2) of the receiving elements (20.1, 20.2) oriented perpendicular with respect to the fastening surface which determine the height of the receptacle; and a facing side of each of two first legs (21.1, 21.2) of the L-shaped receiving elements (20.1, 20.2) having the projecting support strips (22.1, 22.2) which are insertable into longitudinal grooves (11) of the busbar (10).

2. In the support in accordance with claim 1, wherein the busbar (10) has a generally square exterior cross section and has in a center area the longitudinal grooves (11) of T-shaped cross section.

3. In the support in accordance with claim 2, wherein the second legs (23.1, 23.2) of the receiving elements (20.1, 20.2) are aligned parallel with the fastening surface and correspond to a width of several busbars (10.1 and 10.2, 10.3 and 10.4).

4. In the support in accordance with claim 3, wherein the first legs (21.1, 21.2) of the receiving elements (20.1, 20.2) are laid out for a height of several busbars (10.1 and 10.2, 10.3 and 10.4) inserted on top of each other when in the receptacle.

5. The support in accordance with claim 4, wherein at least one side of each of the first legs (21.1, 21.2) of the receiving elements (20.1, 20.2), which define one receptacle and face each other, has respectively one support strip (22.1, 22.2) corresponding to each said busbar (10.1 and 10.4).

6. In the support in accordance with claim 5, wherein the receptacle is closed by a plurality of strip-shaped cover elements (30, 30.1), which can be screwed together with front faces of the first legs (21.1, 21.2) of the receiving elements (20.1, 20.2).

7. In the support in accordance with claim 6, wherein the sides of the receiving elements (20.1, 20.2) facing the fastening surface each have at least one dovetailed fastening strip (27.1, 27.2) insertable into a dovetailed fastening groove (41) of a fastening rail (40).

8. In the support in accordance with claim 7, wherein the dovetailed fastening strips (27.1, 27.2) of the receiving elements (20.1, 20.2) and the dovetailed fastening groove (41) of the fastening rail (40) extend transversely with respect to the longitudinal direction of the busbars (10, 10.1 to 10.4).

9. In the support in accordance with claim 7, wherein the dovetailed fastening strips of the receiving elements (20.1, 20.2) and the dovetailed fastening groove of the fastening rail (40) are aligned in the longitudinal direction of the busbars (10, 10.1 to 10.4).

10. In the support in accordance with claim 9, wherein the busbars (10) maintained in the receiving elements (20.1, 20.2) are maintained at a distance from each other by a plurality of spacer elements (28.0), wherein the spacer elements (28.0) are insertable into the fastening rail (40) and maintained therein.

11. In the support in accordance with claim 1, in the busbar system comprising more than one busbar wherein the second legs (23.1, 23.2) of the receiving elements (20.1, 20.2) of a first busbar are designed for a half of the width of a busbar (10) with a narrowest width, and that the front faces of the second legs (23.1, 23.2) of the first busbar are connected with each other by a plurality of connecting elements having dimensions matched to a whole number multiple of a width of a smallest busbar (10).

12. In the support in accordance with claim 1, wherein the second legs (23.1, 23.2) of the receiving elements (20.1, 20.2) are aligned parallel with the fastening surface and correspond to a width of several busbars (10.1 and 10.2, 10.3 and 10.4).

13. In the support in accordance with claim 2, wherein the first legs (21.1, 21.2) of the receiving elements (20.1, 20.2) are laid out for a height of several busbars (10.1 and 10.2, 10.3 and 10.4) inserted on top of each other when in the receptacle.

14. The support in accordance with claim 13, wherein at least one side of each of the first legs (21.1, 21.2) of the receiving elements (20.1, 20.2), which define one receptacle and face each other, have respectively one support strip (22.1,22.2) corresponding to each said busbar (10.1 and 10.4).

15. In the support in accordance with claim 1, wherein the receptacle is closed by a plurality of strip-shaped cover elements (30, 30.1), which can be screwed together with front faces of the first legs (21.1, 21.2) of the receiving elements (20.1, 20.2).

16. In the support in accordance with claim 1, wherein at least one side of each of the receiving elements (20.1, 20.2) facing the fastening surface has dovetailed fastening strip (27.1, 27.2) insertable into a dovetailed fastening groove (41) of a fastening rail (40).

17. In the support in accordance with claim 16, wherein the dovetailed fastening strips (27.1, 27.2) of the receiving elements (20.1, 20.2) and the dovetailed fastening groove (41) of the fastening rail (40) extend transversely with respect to the longitudinal direction of the busbars (10, 10.1 to 10.4).

18. In the support in accordance with claim 16, wherein the dovetailed fastening strips of the receiving elements (20.1, 20.2) and the dovetailed fastening groove of the fastening rail (40) are aligned in the longitudinal direction of the busbars (10, 10.1 to 10.4).

19. In the support in accordance with claim 4, wherein the busbars (10) maintained in the receiving elements (20.1, 20.2) are maintained at a distance from each other by a plurality of spacer elements (28.0), wherein the spacer elements (28.0) are insertable into the fastening rail (40) and maintained therein.

* * * * *